(12) United States Patent
Hirata

(10) Patent No.: US 7,523,389 B2
(45) Date of Patent: Apr. 21, 2009

(54) DOCUMENT DISPLAY DEVICE, METHOD, AND PROGRAM PRODUCT

(75) Inventor: Takamasa Hirata, Kodaira (JP)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 11/249,913

(22) Filed: Oct. 13, 2005

(65) Prior Publication Data

US 2006/0085733 A1 Apr. 20, 2006

(30) Foreign Application Priority Data

Oct. 19, 2004 (JP) ............................. 2004-304282

(51) Int. Cl.
  *G06F 17/21* (2006.01)
(52) U.S. Cl. ...................... 715/205; 715/207; 715/790; 715/768
(58) Field of Classification Search ......... 715/205–208, 715/255, 790, 810, 768
See application file for complete search history.

(56) References Cited

U.S. PATENT DOCUMENTS

| | | | | |
|---|---|---|---|---|
| 5,908,467 A * | 6/1999 | Barrett et al. | ............... | 709/218 |
| 6,342,906 B1 * | 1/2002 | Kumar et al. | ............... | 715/751 |
| 6,542,165 B1 * | 4/2003 | Ohkado | ....................... | 715/751 |
| 6,820,111 B1 * | 11/2004 | Rubin et al. | ................. | 709/203 |
| 2002/0007493 A1 * | 1/2002 | Butler et al. | ................. | 725/109 |
| 2003/0208472 A1 * | 11/2003 | Pham | ........................... | 707/2 |
| 2004/0199871 A1 * | 10/2004 | Lee | ............................. | 715/513 |
| 2006/0177136 A1 * | 8/2006 | Windl | ........................ | 382/189 |
| 2007/0277089 A1 * | 11/2007 | Kimmo et al. | ........... | 715/501.1 |

* cited by examiner

*Primary Examiner*—Adam L Basehoar
(74) *Attorney, Agent, or Firm*—James R. Nock; Shimokaji & Associates, P.C.

(57) ABSTRACT

The present invention makes it possible to quickly identify a place where a hyperlink is located in a document being displayed, and to design the document without caring about the indication of the location of the hyperlink. When a control thread is activated, a transparent sheet generation unit stores a transparent sheet into a transparent sheet storage unit; a thread activation unit activates a display thread and a visualization thread to cause a position identifying unit to identify a position where a hyperlink exists in a document being displayed; and to cause a marker drawing unit to draw a marker at the position thus identified in the transparent sheet. When the display thread is activated, a display unit reads a transparent sheet from the transparent sheet storage unit, and displays the transparent sheet in a visible state which has been stored in a visibleness state storage unit. When the visibleness thread is activated, an instruction reception unit receives an instruction from a user, and a visualization unit stores the visibleness state of the transparent sheet into the visibleness state storage unit in response to the instruction.

2 Claims, 13 Drawing Sheets

Locations of hyperlinks

Region1 (x11,y11)-(x12,y12)

Region2 (x21,y21)-(x22,y22)

...

Regionn (xn1,yn1)-(xn2,yn2)

FIG. 2

DOCUMENT DISPLAY DEVICE, METHOD, AND PROGRAM PRODUCT

FIELD OF THE INVENTION

The present invention relates to a document display device or the like which displays a document that is composed of text, a still image, a moving image and the like, and more specifically to a document display device which displays a document in which a hyperlink is embedded.

BACKGROUND OF THE INVENTION

Nowadays, there are many web sites on the Internet. For many of the web pages constituting those web sites, it has been seen recently that the designs are quite colorful and elaborate. As such a web page, there is, for example, one in which not only text has been used for a description, but a lot of still images and moving images have also been taken in. The reason why such web pages have been seen recently is that, when a web page which is described using text only is compared with one which is described using still images and moving images, the latter one using still images and moving images can be more highly expected to obtain an effect which is visually appealing to viewers. It is expected that the number of web pages such as the above that are visually appealing will continue increasing.

Meanwhile, a hyperlink is generally embedded in a web page. The hyperlink is address information for other web pages and other data, by tracing which various pieces of information can be gathered. Recently, such a hyperlink is sometimes embedded not only within text, but embedded also within still images, moving images, and the like.

Therefore, when a web page is complex in design, it is often not easy to quickly identify a place where a hyperlink is embedded.

When a hyperlink is embedded within text, it is possible to indicate that the hyperlink is embedded, by underlining the part thereof or by changing the color thereof. However, when a hyperlink is embedded within an elaborate image or the like, since it is difficult to indicate the embedding of the hyperlink using such a simple decoration, a technique is adopted in which a special decoration is added so as to indicate the embedding of the hyperlink. In any case, at present, care must be taken by a web page designer to let users know that a hyperlink is embedded in a web page.

Incidentally, it is also possible to let a viewer identify a position where a hyperlink is embedded by causing the shape of a cursor to be changed when the cursor is moved to the position. However, the method is not one which enables a viewer to quickly identify the position of a hyperlink within a web page.

Meanwhile, it has been proposed (for example, see Japanese Published Patent Application 10-116220 (FIG. 5 in page 9), hereinafter referred to as "Patent Literature 1") that an estimated time, which is necessary for downloading contents linked to a hyperlink, is indicated, as a mark, in the vicinity of a position where the hyperlink is embedded.

However, the invention in Patent Literature 1 is one by which the mark is just displayed in the vicinity of a position where a hyperlink exists, but is not one by which the positions of hyperlinks are all together displayed on a display screen. Therefore, there has been a problem where a viewer cannot grasp the positions where the hyperlinks exist.

There is also software with a function, which shows information related to hyperlinks. For example, such software is one by which, when there are hyperlinks on a web page, which is in the middle of making, and when these hyperlinks are linked to images, the images are all together shown on another window; or is one by which "href" references within a hypertext are all together shown on another window. However, use of such software, which causes information related to hyperlinks to be shown on another display screen, does not make it possible to grasp the positions on an actual display screen where hyperlinks are located.

SUMMARY OF THE INVENTION

The present invention was made to solve the above-described technical problems, and an object thereof is to enable a user to quickly identify the position of a hyperlink in a document, which is being displayed.

Another object thereof is to enable a designer to concentrate on a design work for a document without concerning about indicating the location of a hyperlink.

To achieve the above-described object in the present invention, a display device on which a document including hyperlinks on text, still images, moving images and the like is loaded dynamically controls areas where the hyperlinks exist, on a display area for the document, and displays the areas all together in a visible manner. That is, a document display device of the present invention includes display means for displaying a document, which includes a hyperlink, on a predetermined display area; and identifying means for identifying a position on the display area where a place that the hyperlink is embedded is displayed. The display means displays a specific marker at the position identified by the identifying means on the display area.

Meanwhile, it is possible to cause the areas where the hyperlinks exist to be displayed all together, for example, following an instruction given by a user when the user wants to know the areas. That is, in the document display device, the display means can be configured to display a specific marker in response to an instruction given from outside.

Furthermore, to be more specific, displaying all together the areas where the hyperlinks exist can be made possible by using a transparent display area (transparent sheet). In this case, the document display device of the present invention further includes generation means for generating a transparent display area which the document can be seen through and which is provided, as an upper layer for a display area, at a position where the transparent display area laps over the display area where a document is displayed; and drawing means for drawing the specific marker at a position on the transparent display area, the position corresponding to the position on the display area which is identified by the identifying means. The display means displays the transparent display area, and thereby displays the specific marker. Incidentally, here, "displaying of the transparent display area" means to display the transparent display area in a visible manner. The display unit may be configured such that the transparent display area, which is initially invisible, is changed to become visible in response to an external instruction so as to be displayed.

Moreover, the present invention can be considered as a document display method for a computer. In this case, a document display method of the present invention includes the steps of causing a computer to display a document, which includes a hyperlink, on a predetermined display area; causing the computer to identify a position on the display area where a place within a document that the hyperlink is embedded is displayed; and of causing the computer to display a specific marker at the position thus identified on the display area.

In addition, the displaying of the specific marker to the position where the hyperlink is embedded can be performed with the transparent display area (transparent sheet). In this case, the step of causing the computer to display the specific marker, further includes the steps of generating a transparent display area which the document can be seen through and which is provided, as an upper layer for a display area, at a position where the transparent display area laps over the display area on which the document is displayed; drawing the specific marker at a position on the transparent display area, the position corresponding to the position on the display area which is identified by the identifying means; and of displaying the transparent display area. Incidentally, here, "displaying of the transparent display area" means to dispose the transparent display area at a predetermined position irrespective of whether the transparent display area is visible or invisible. The step of displaying the transparent display area may be configured to, further include the steps of causing the transparent display area to be invisible; receiving an instruction from outside; and of causing the transparent display area to be visible in response to the instruction.

Meanwhile, the present invention can be considered as a program which causes a computer to achieve given functions. In this case, a program of the present invention causes the computer to achieve the functions of displaying a document, which includes a hyperlink, on a predetermined display area; identifying a position on the display area where a place within the document that the hyperlink is embedded is displayed; and of displaying a specific marker at the position identified on the display area.

Incidentally, the displaying of the specific marker to the position where the hyperlink is embedded can be achieved with the transparent display area (transparent sheet). In this case, in the function of displaying the specific marker, there can be further achieved the functions of generating a transparent display area which the document can be seen through, the transparent display area which is provided, as an upper layer for a display area, at a position where the transparent display area overlaps the display area where a document is displayed; drawing a specific marker at a position on the transparent display area, the position corresponding to the position thus identified on the display area; and of displaying the transparent display area. Incidentally, here, "displaying of the transparent display area" means to dispose the transparent display area at a predetermined position irrespective of whether the transparent display area is visible or invisible. The function of displaying the transparent display area may be configured to further achieve the functions of causing the transparent display area to be invisible; receiving an instruction from outside; and of causing the transparent display area to be visible in response to the instruction.

The present invention enables a user to quickly identify a place where a hyperlink exists in a document which is displayed.

BRIEF DESCRIPTION OF THE DRAWINGS

For a more complete understanding of the present invention and the advantages thereof, reference is now made to the following description taken in conjunction with the accompanying drawings.

FIG. 2 is an example of information with respect to a position of the embedding of a hyperlink managed by a document display device in the embodiment mode according to the present invention.

DETAILED DESCRIPTION OF THE PREFERRED EMBODIMENTS

A best mode (hereinafter, referred to as "embodiment mode") for carrying out the present invention is described below in detail with reference to the accompanying drawings.

First Embodiment Mode

Figure 1:
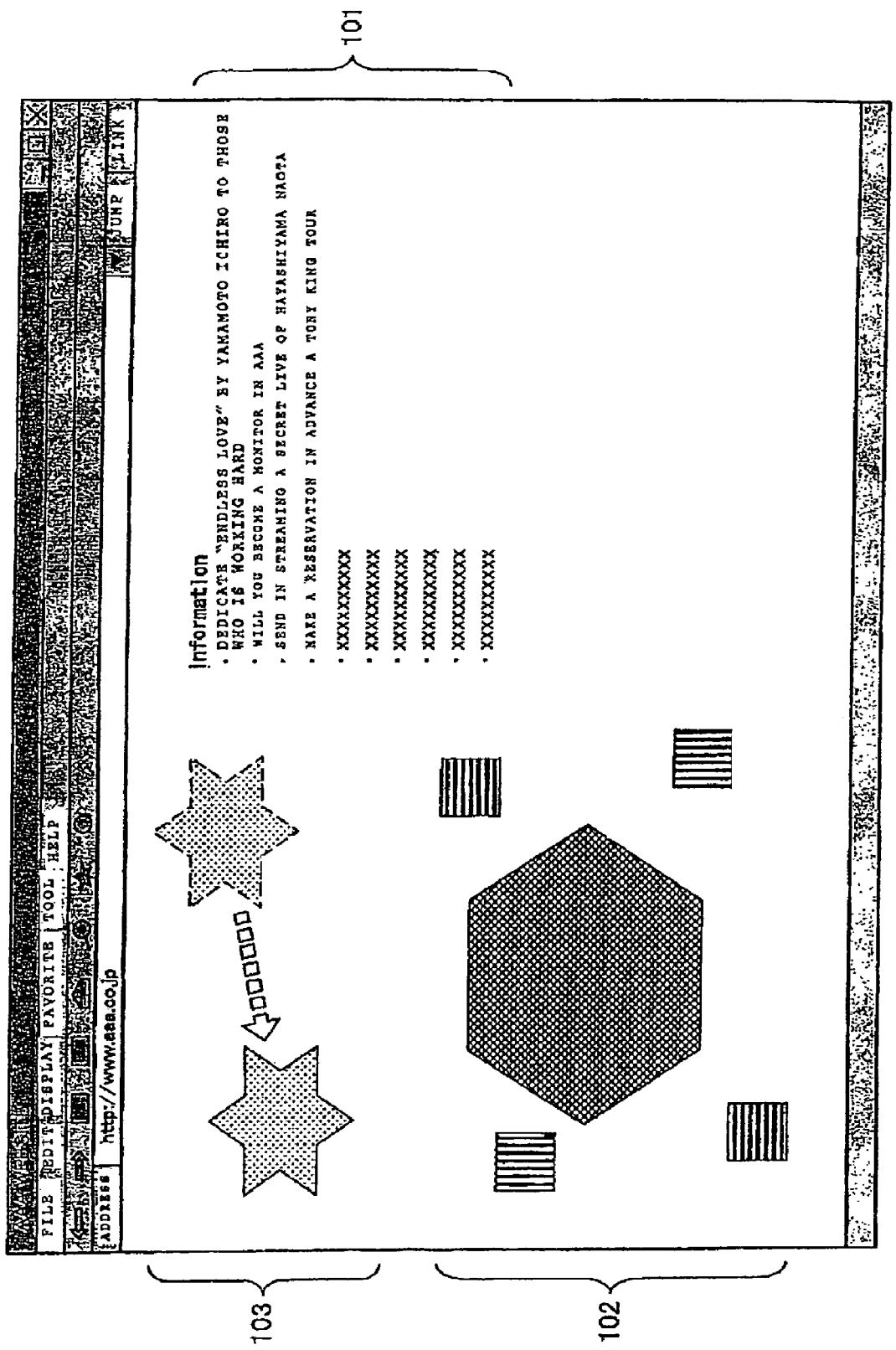
FIG. 1 is a diagrammatic view showing an example of a display before drawing markers in an embodiment mode according to the present invention.

In a document display device of the present embodiment mode, first, a document display program causes, for example, a document shown in FIG. 1 to be displayed. In this document, it is assumed that hyperlinks are embedded in a text part 101, a still image part 102, and a moving image part 103. In the moving image part 103, it is assumed that a graphic moves along an arrow from a position where the graphic is surrounded with a dashed line, to a position where the graphic is surrounded with a solid line at a time when the picture image in FIG. 1 is displayed. Meanwhile, for such a moving image, a hyperlink can be embedded using, for example, Macromedia Flash™. In that case, the hyperlink follows a graphic as the graphic moves. The moving image may be such that, when an instruction is given to a graphic or the like where no hyperlink is embedded, a graphic or the like where a hyperlink is embedded newly shows up.

In addition, the document display program of the present embodiment mode may be any program, which has a function of displaying a document, such as a program (for example, a Web browser) for browsing a document such as a web page, or a program (for example, website design software) for creating a document such as a web page.

The document display device of the present embodiment mode displays all together the places of the hyperlinks which are embedded in the text part 101, the still image part 102, and the moving image part 103 in FIG. 1.

In order to achieve the above, it is necessary to dynamically acquire the positions of all hyperlinks within a document currently displayed, and to manage these positions as coordinate values for display areas where text, still images, moving images, and the like are actually displayed. For acquiring/managing the positions of such hyperlinks, a technique which is commonly used in a Web browser can be adopted. That is a technique in which, on the Web browser, when a cursor moves to a place where a hyperlink is embedded, a shape for the cursor changes. In order to perform such a control, the technique in which the positions of hyperlinks are dynamically acquired/managed can be also adopted in the present embodiment mode.

However, a technique for acquiring/managing hyperlinks is not limited to only the above technique. For example, if a technique is one which is capable of, when loading a document, analyzing its source code or the like so that the positions of hyperlinks are managed, such a managing technique can be adopted.

FIG. 2 is a diagram showing information with respect to the positions of embeddings of hyperlinks which are acquired/managed by any of the above techniques. In FIG. 2, all the places where hyperlinks are embedded are considered to be rectangular domains. For example, each rectangular domain is managed with the coordinate values at the upper left point and the lower right point of its domain. Since a domain with any shape can be viewed as a collection of extremely small rectangular domains, all domains can be managed by such a managing technique.

However, a managing technique other than that in FIG. 2 may be also adopted. For example, when a circular domain is considered, it can be managed with the coordinate value of the center and the radius. When considering a polygon, it can be managed with the coordinate values of the vertexes.

Figure 3:
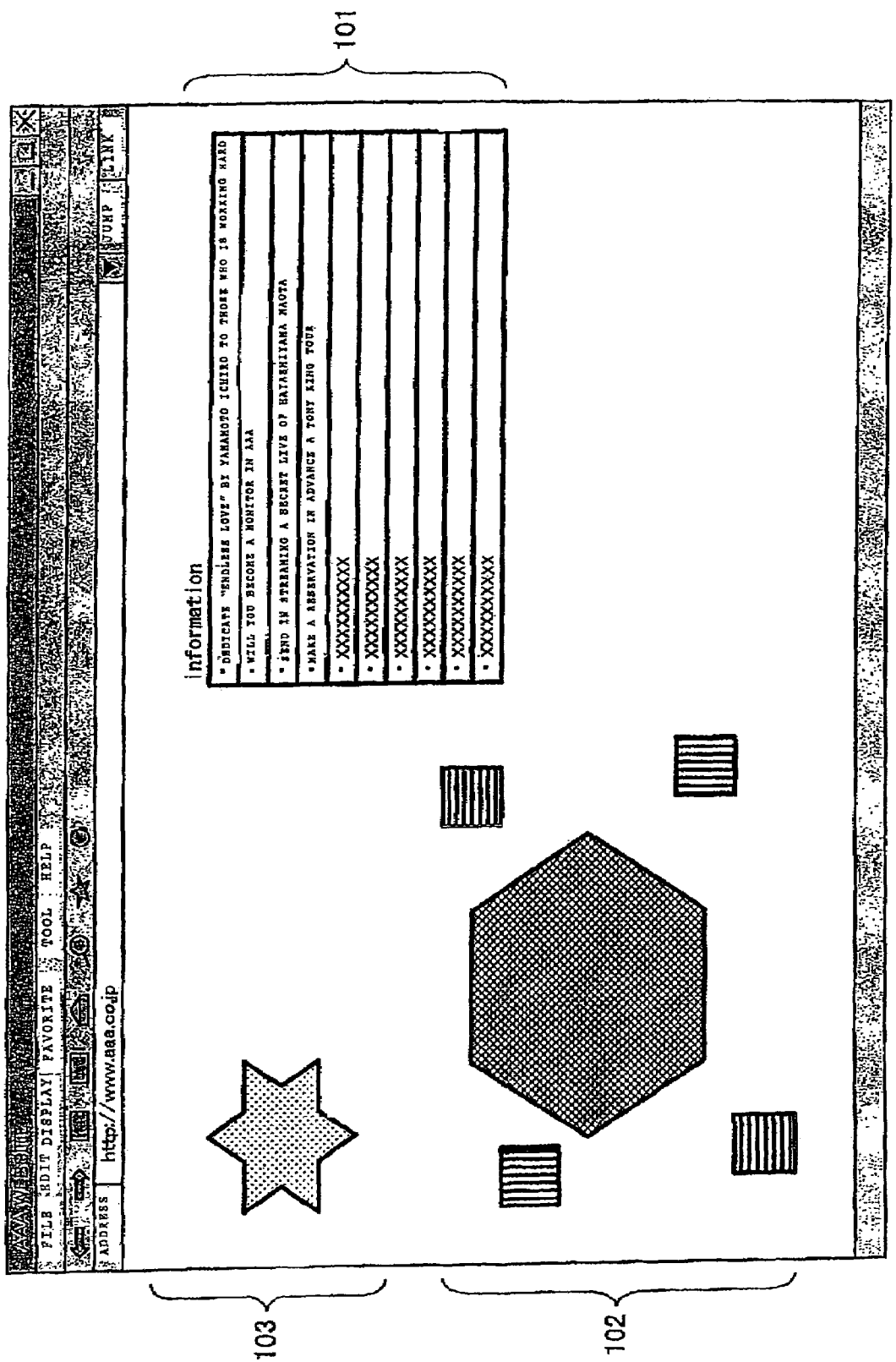
FIG. 3 is a diagrammatic view showing an example of a display after drawing markers thereon in a first embodiment mode according to the present invention.

Referring to the above coordinate information, the document display device of the present embodiment mode displays a marker indicating that a hyperlink is embedded, at a position on a display area where the embedded hyperlink is displayed. To be more specific, the screen display in FIG. 1 is changed to that in FIG. 3 in response to a trigger from a user. As the trigger from a user, various types such as a menu provided in a document display program and a specified shortcut key may be considered. In FIG. 3, as the marker indicating that a hyperlink is embedded, a thick solid line, which surrounds a position where the hyperlink is embedded, is used. However, as long as the presence of a marker can cause a position where the hyperlink is embedded to be distinct, any marker, which is a graphic other than the above, a symbol or the like, may be used. A technique in which the marker is intermittently displayed (for example, causing the marker to blink) may be adopted to further enhance a visual effect for the marker.

Figure 4:
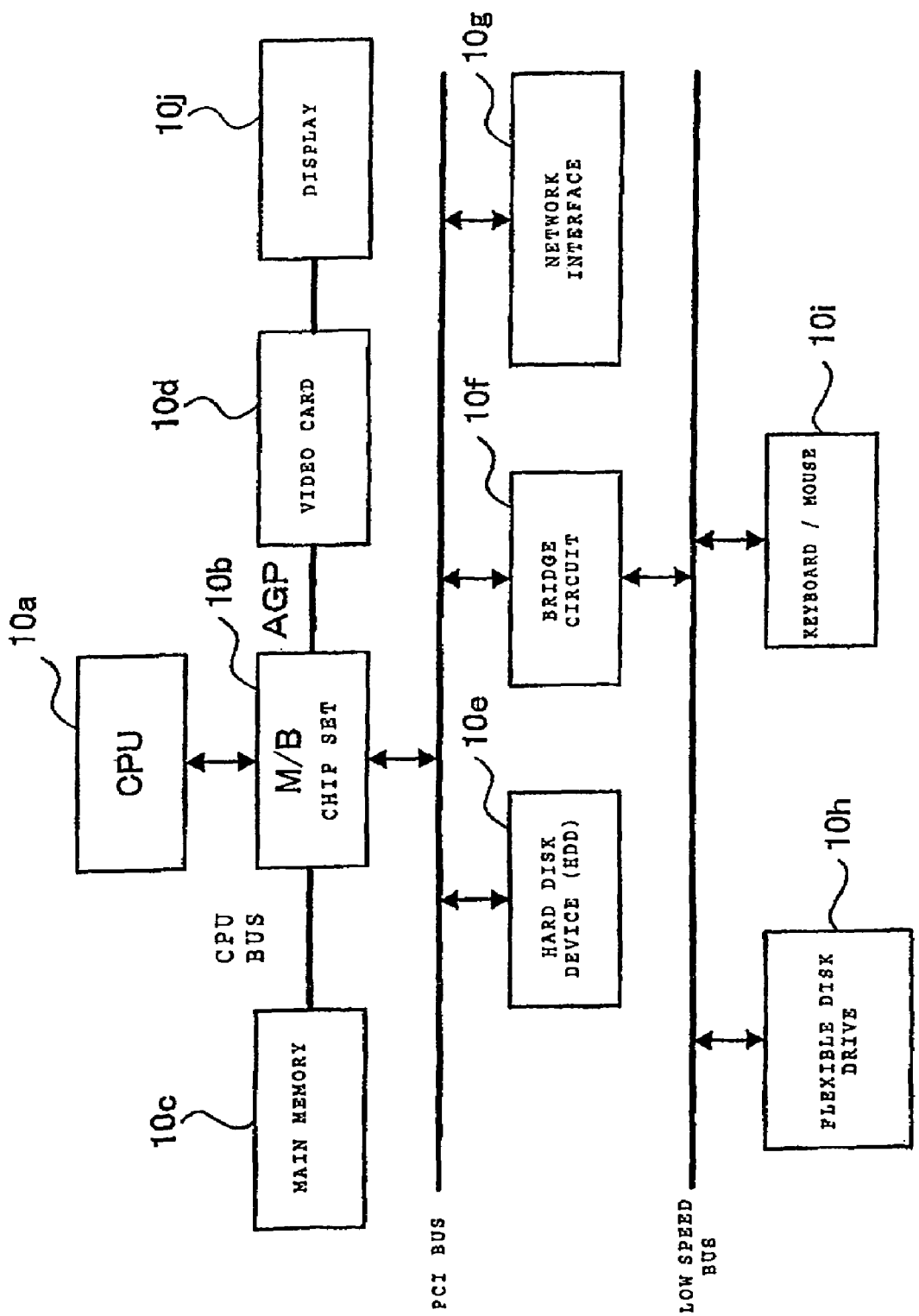
FIG. 4 is a block diagram showing a hardware configuration of a document display device in the embodiment mode according to the present invention.

FIG. 4 is a schematic view for showing an example of a hardware configuration of a suitable computer, which is used as a document display device in the present embodiment mode.

The computer shown in FIG. 4 includes a CPU (Central Processing Unit) 10a which is an operation unit; a main memory 10c which is connected to the CPU 10a through an M/B (Mother Board) chipset 10b and a CPU bus; and a video card 10d and a display 10j which are connected to the CPU 10a through the M/B chipset 10b and an AGP (Accelerated Graphic Port). In addition, the computer includes a hard disk device (HDD) 10e, which is connected to the M/B chipset 10b through a PCI bus (Peripheral Component Interconnect), and a network interface 10g. The computer further includes a flexible disk drive 10h and a keyboard/mouse 10i which are connected to the M/B chipset 10b through the PCI bus and low speed buses such as a bridge circuit 10f and an ISA (Industry Standard Architecture) bus.

FIG. 4 is only to illustrate a hardware configuration for the computer using an example, which realizes the present embodiment mode. Hence, various other configurations may be taken into consideration as long as they are applicable to the present embodiment. For example, there may be considered a configuration where, instead of providing the video card 10d, only a video memory is mounted, and main data is processed in the CPU 10a. There may be considered another configuration where a CD-R (Compact Disc Recordable) drive and a DVD-RAM (Digital Versatile Disc Random Access Memory) drive are provided, as an external memory unit, through an interface such as an ATA (AT Attachment) or a SCSI (Small Computer System Interface).

Meanwhile, the document display device of the present embodiment mode displays a maker indicating that a hyperlink is embedded, at a position on a display area where a place within a document that the hyperlink is embedded is displayed. Various specific methods for displaying a marker on a document can be considered. For example, the document display program may be used to cause a marker to be directly drawn on the document being displayed in response to a trigger from a user.

However, in this method, since a drawing process is started only after receiving an instruction from the user, it takes time until the displaying of all makers is completed. Therefore, in the present embodiment mode, as a most preferable embodiment, the document display program causes markers to be drawn on a transparent sheet of a document, and also causes the markers thus drawn to be retained as it is; and causes the markers to be shown up only when an instruction is given by a user. To be more specific, first, a transparent sheet is provided as an upper layer at a position where the transparent sheet laps over an area where the document is displayed, and the transparent sheet is kept to be invisible. Markers, which indicate the positions of hyperlinks at that moment, are drawn on the transparent sheet, and the makers thus drawn are retained as it is. When an instruction is, thereafter, given by a user, the transparent sheet is caused to be visible to display the markers all together.

Incidentally, the displaying of such markers all together can be realized using a program incorporated into the document display program (plug-in). It can also be realized by causing a program, which is independent of the document display program, to make communication in process with the document display program. In the present embodiment, a description is given assuming that it is realized using a plug-in.

Figure 5:
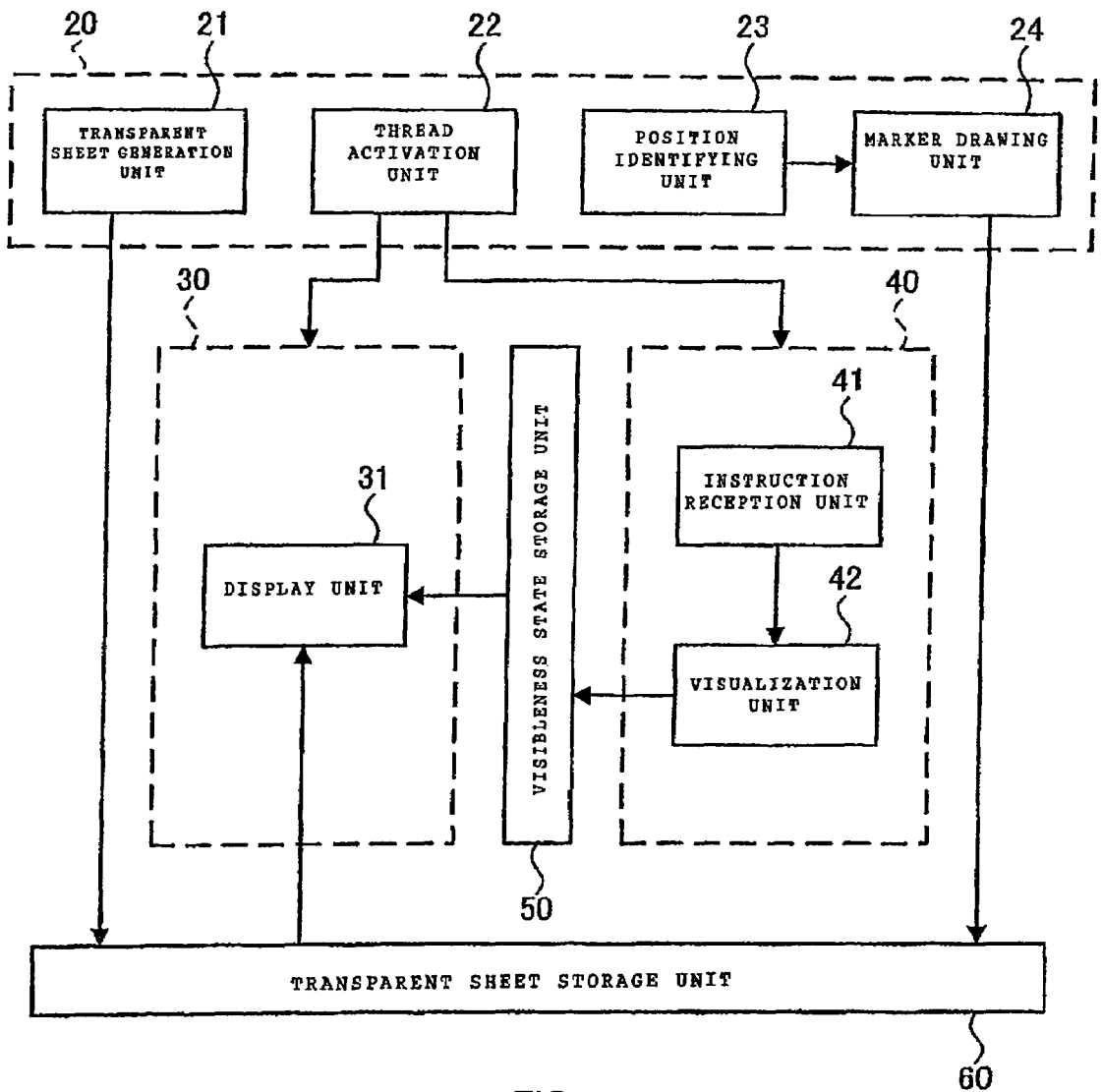
FIG. 5 is a block diagram showing a functional configuration of the document display device in the first embodiment mode according to the present invention.

FIG. 5 is a diagrammatic view showing, among functional configurations for the document display device, a functional configuration which is realized by mainly executing a plug-in. A document display program where a plug-in is incorporated is read into the main memory 10c by the CPU 10a, and is executed, hence realizing the functions. Here, predetermined functions are realized by operating three threads using the plug-in. To be more specific, the three threads are a control thread 20, a display thread 30 and a visualization thread 40.

Meanwhile, in the main memory 10c, a visibleness state storage unit 50 and a transparent sheet storage unit 60 are realized. The visibleness state storage unit 50 is a unit which manages a correspondence between identification information for each sheet, which is managed by the document display program, and a visibleness state corresponding thereto. In the present embodiment, in particular, a correspondence between a transparent sheet and its visibleness state is referred/updated. The transparent sheet storage unit 60 is a unit which stores a transparent sheet that is generated by the control thread 20.

The control thread 20 is operated, whereby a transparent sheet generation unit 21, a thread activation unit 22, a position identifying unit 23, and a marker drawing unit 24 are realized. The transparent sheet generation unit 21 is a unit which has a function of generating a transparent sheet and storing the transparent sheet in the transparent sheet storage unit 60, and which can be perceived as a generation means. The thread activation unit 22 is a unit having a function of activating the display thread 30 and the visualization thread 40. The position identifying unit 23 is a unit having a function of acquiring regularly (every $T_1$) information with respect to the places of the embeddings of hyperlinks, and identifying the places thereof. The position identifying unit 23 is perceived as an identifying means. The marker drawing unit 24 is a unit having a function of drawing a marker at a position on a transparent sheet, the position corresponding to a display position for a place thus identified. The marker drawing unit 24 is perceived as a drawing means.

Meanwhile, the display thread 30 is operated, and thereby a display unit 31 is realized. The display unit 31 is a unit having a function of reading regularly (every $T_2$) a transparent sheet stored in the transparent sheet storage unit 60, and displaying the transparent sheet in a visibleness state stored in the visibleness state storage unit 50. The display unit 31 is perceived as a displaying means. However, the displaying means may be perceived as a means which includes a function of performing a document display in the document display program.

In addition, the visualization thread 40 is operated, and thereby an instruction reception unit 41 and a visualization unit 42 are realized. The instruction reception unit 41 is a unit having a function of receiving an instruction from a user, while the visualization unit 42 is a unit having a function of storing the visibleness state for a transparent sheet into the visibleness state storage unit 50, in response to an instruction from a user.

Next, the operations of the control thread 20 are described with reference to FIG. 6.

When the document display program is activated, an execution of a plug-in is started, and thereby the control thread 20 is operated. First, a transparent sheet is generated by the transparent sheet generation unit 21, and stored in the transparent sheet storage unit 60 (Step 101). The display thread 30 is activated (Step 102) along with the visualization thread 40 (Step 103) by the thread activation unit 22.

Subsequently, the position of the embedding of a hyperlink on a display area is identified by the position identifying unit 23 on the basis of coordinate information managed by the document display program (Step 104). Then, a given marker is drawn at a position on a transparent sheet, which corresponds to the position thus identified (Step 105).

Meanwhile, the control thread 20 waits until the time $T_1$ elapses (Step 106), returns to Step 104 when the time $T_1$ elapses, and causes a process of the drawing makers on the transparent sheet to be repeated.

Next, the operations of the display thread 30 are described with reference to FIG. 7.

When the display thread 30 is activated by the control thread 20, the display unit 31 first reads a transparent sheet (Step 201). Subsequently, the visibleness state stored in the visibleness state storage unit 50 is determined on whether the visibleness state is visible or invisible (Step 202). When the visibleness state indicates a visible state, the display unit 31 causes the transparent sheet to be visible, and displays the transparent sheet (Step 203). In contrast, when the visibleness state indicates an invisibleness state, the display unit 31 causes the transparent sheet to be invisible, and displays the transparent sheet (Step 204).

The display thread 30 waits until the time $T_2$ elapses (Step 205), returns to Step 201 when the time $T_2$ elapses, and causes a process of reading and displaying a transparent sheet to be repeated.

Figure 8:
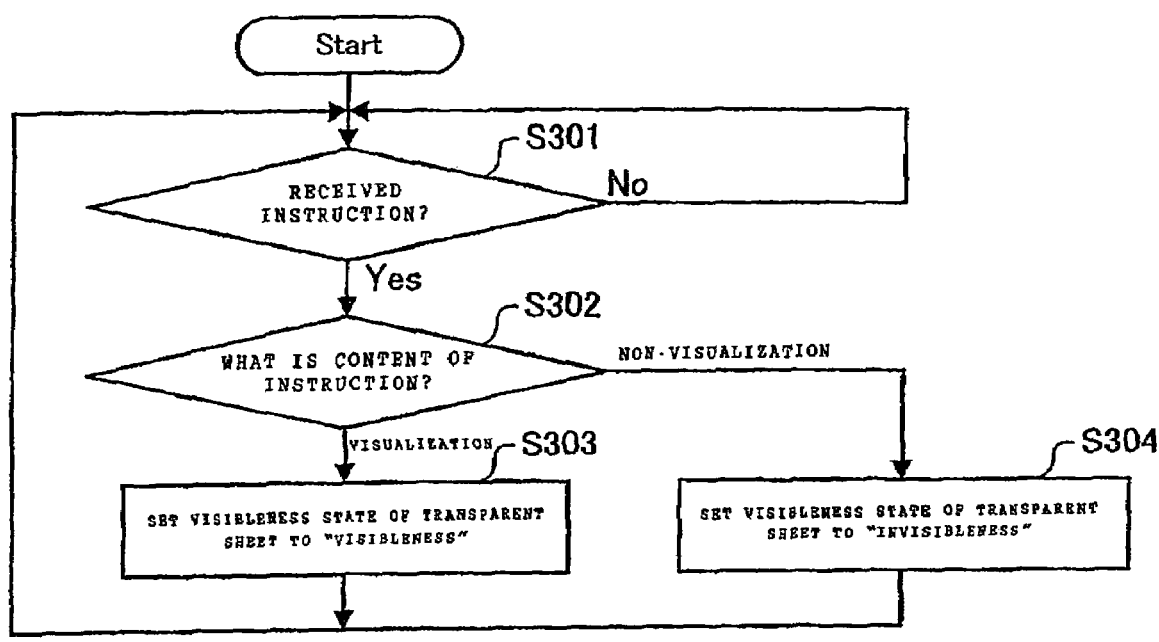
FIG. 8 is a flowchart showing the operations of a visualization thread in the first embodiment mode according to the present invention.

Next, the operations of the visualization thread 40 are described with reference to FIG. 8.

When the visualization thread 40 is activated by the control thread 20, the instruction reception unit 41 first waits an instruction from a user (Step 301). When receiving an instruction, the content of the instruction is determined (Step 302). When the result shows that the content of the instruction indicates "visualization," the visualization unit 42 changes the visibleness state for a transparent sheet in the visibleness state storage unit 50 to be "visibleness" (Step 303). In contrast, when the content of the instruction indicates "non-visualization," the visualization unit 42 changes the visibleness state for a transparent sheet in the visibleness state storage unit 50 to be "invisibleness" (Step 304).

Figure 7:
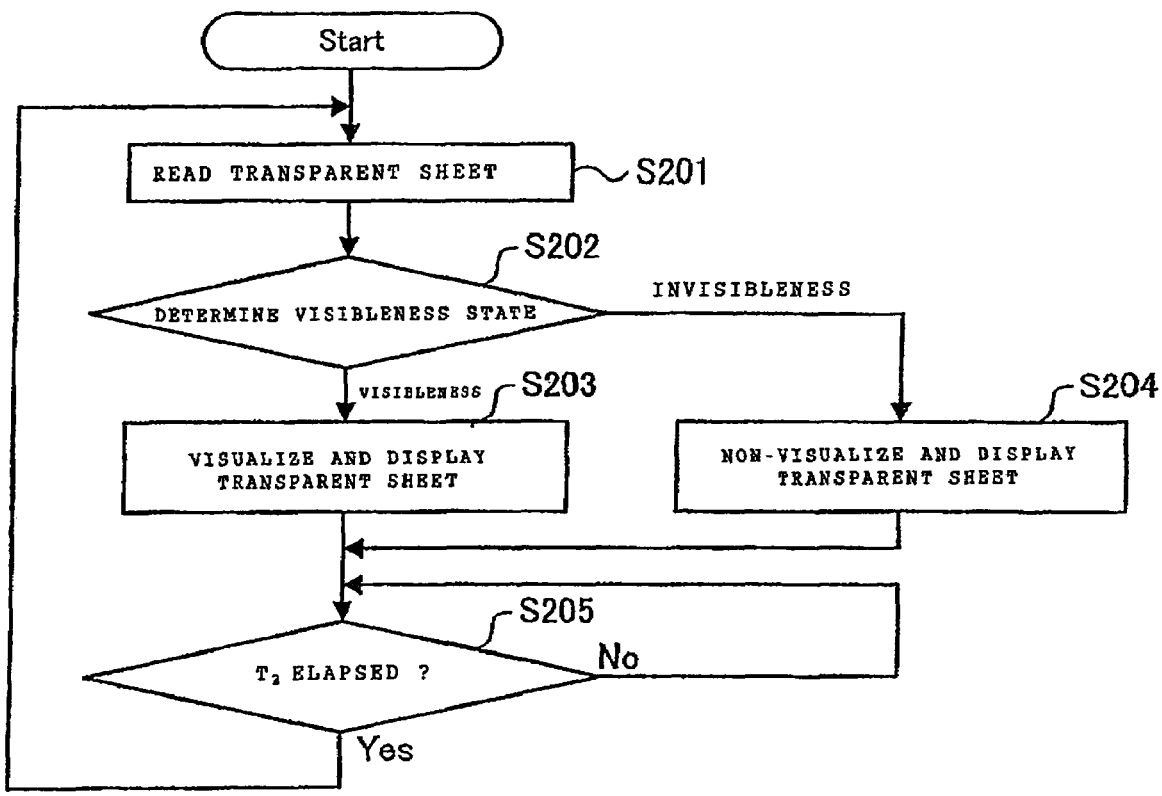
FIG. 7 is a flowchart showing the operations of a display thread in the embodiment mode according to the present invention.
Figure 9:
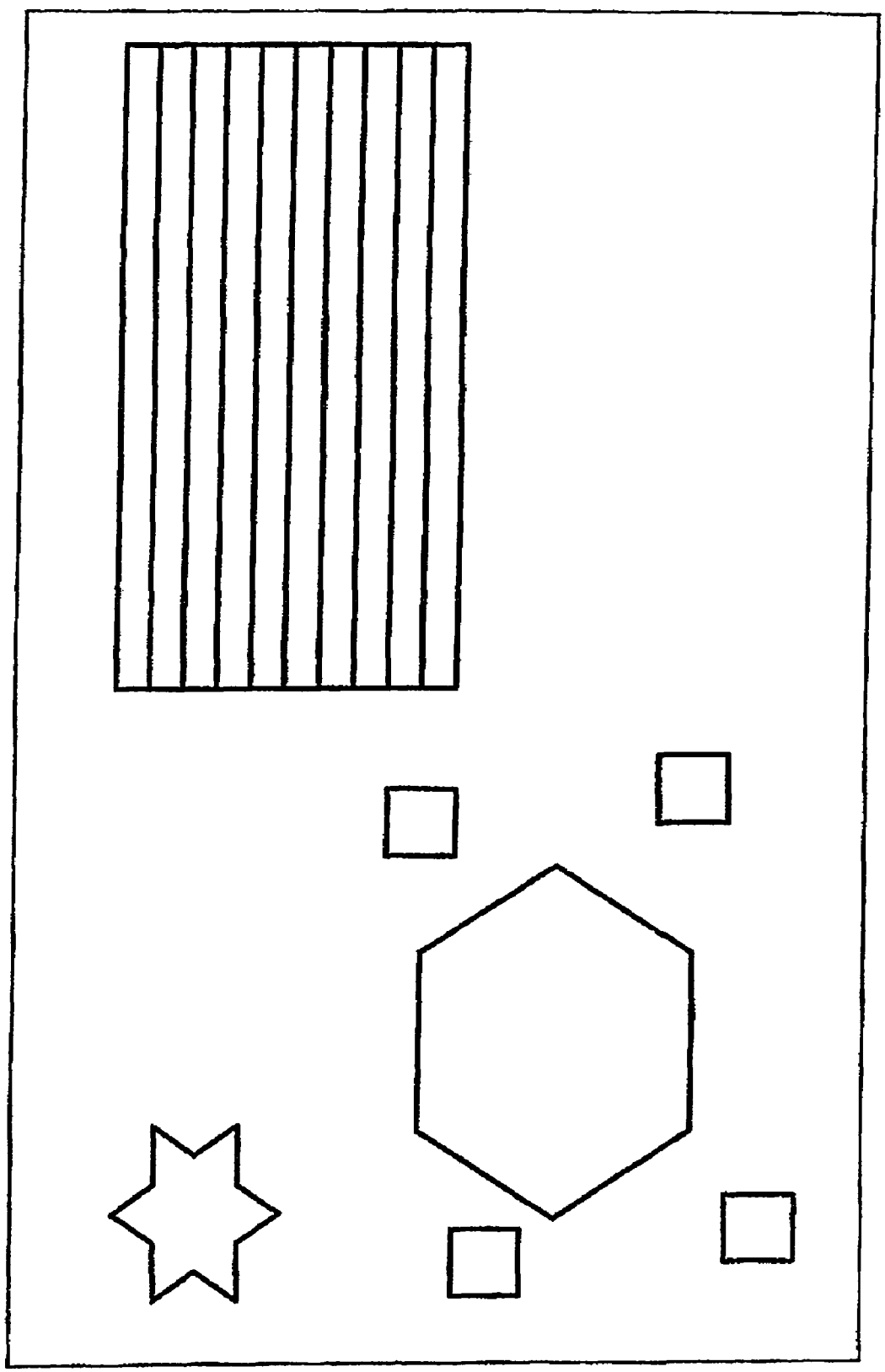
FIG. 9 is a diagrammatic view showing an example of a transparent sheet after drawing markers thereon in the first embodiment mode according to the present invention.

That is, since a determined result in Step 202 of FIG. 7 indicates "invisibleness" until a user gives an instruction for visualization, the display thread 30 causes a transparent sheet to be non-visualized, and to be displayed. In this case, the screen display is retained as it is, as shown in FIG. 1. Then, when a user gives an instruction for visualization, a determined result in Step 202 of FIG. 7 becomes "visibleness" and thus the display thread 30 causes the transparent sheet to be visualized, and to be displayed. In this case, the transparent sheet where the control thread 20 causes a marker to be drawn is displayed on the document. To be more specific, a transparent sheet where graphics are drawn as shown in FIG. 9 is covered on the document in FIG. 1, and is caused to be visualized, hence producing a display such as one shown in FIG. 3.

As described above, in the present embodiment mode, a transparent sheet is covered on a document, and is caused to be non-visualized; and then a marker is drawn at a position where a place that a hyperlink is embedded is displayed, and the transparent sheet is visualized to display the marker in response to an instruction from a user. Even for a document, which is complex and elaborate in design, this configuration makes it possible to quite easily identify the positions of hyperlinks within the document.

Meanwhile, in the present embodiment mode, when a document including a hyperlink is displayed, the position of the hyperlink is displayed using a function of the document display device. That is, a display function of displaying the position of the hyperlink is separated from a function of creating a document. Therefore, one who designs and creates a document does not have to care for creating a special decoration for a hyperlink, and thus a degree of freedom to designing is increased.

Incidentally, in the present embodiment mode, while a transparent sheet is used for the drawing of a marker, the sheet is not necessarily a transparent one. That is, a display area, which a document is seen through, is prepared, and a marker may be drawn on the display area.

Second Embodiment Mode

Also in a document display device of the present embodiment mode, a document display program, first, for example, causes a document such as one shown in FIG. 1 to be displayed. In addition, the document display program of the present embodiment mode may also be any program, which has a function of displaying a document, such as a program (for example, a Web browser) for browsing a document such as a web page, or a program (for example, website design software) for creating a document such as a web page.

The document display device of the present embodiment mode displays the places of embeddings of hyperlinks all together as in the first embodiment mode, and, in addition, displays information (hereinafter, referred to as "key information") indicating keys on a keyboard which are allocated to the respective hyperlinks.

In order to achieve the above, as in the first embodiment mode, it is necessary to dynamically acquire the positions of all hyperlinks within a document being currently displayed, and to manage these positions as coordinate values for display areas where text, still images, moving images, and the like are actually displayed. However, since a method for achieving the above is also similar to that in the first embodiment mode, a detailed description is omitted.

Figure 10:
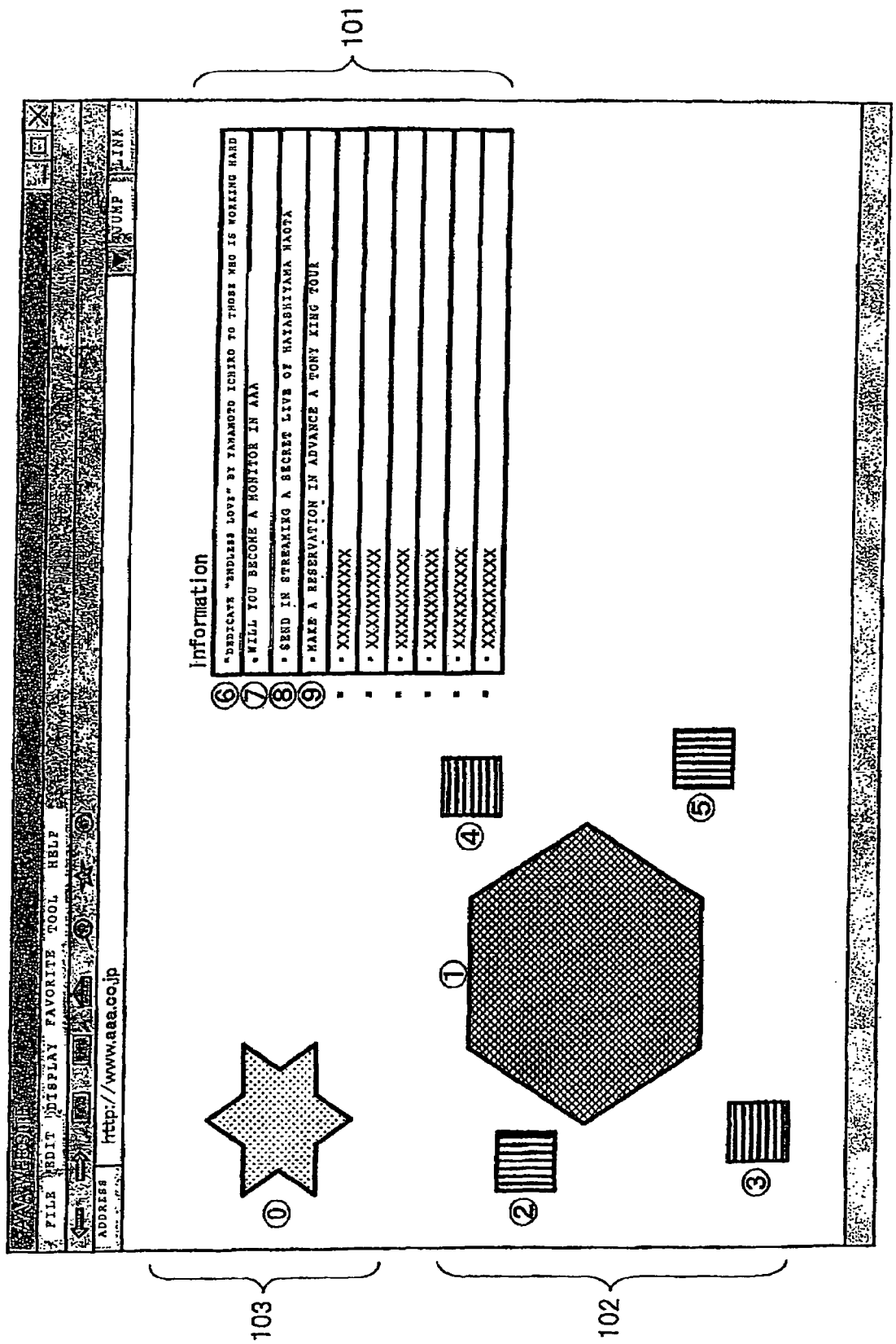
FIG. 10 is a diagrammatic view showing an example of a display after drawing markers and key information in a second embodiment mode according to the present invention.

Referring to the coordinate information, the document display device of the present embodiment mode displays a marker indicating that a hyperlink is embedded, at a position on a display area where a place that the hyperlink is embedded is displayed. In addition, the document display device of the present embodiment mode displays the key information for the hyperlink, at the position or in the vicinity thereof on a display area where a place that the hyperlink is embedded is displayed. To be more specific, the screen display in FIG. 1 is changed to that in FIG. 10 in response to a trigger from a user. As the trigger from a user, various types such as a menu provided in a document display program and a specified shortcut key may be considered. In FIG. 10, as the marker indicating that a hyperlink is embedded, a thick solid line, which surrounds a position where the hyperlink is embedded, is used. However, as long as the presence of a marker can cause a position where the hyperlink is embedded to be distinct, any marker, which is a graphic other than the above, a symbol or the like, may be used. A technique in which the marker is intermittently displayed (for example, causing the marker to blink) may be adopted to further enhance a visual effect for the marker. In FIG. 10, a numeric character key is assumed as a key to be allocated to a hyperlink, and an object where a numeric character is enclosed with a circle is used as the key information. An alphabetic character key or a symbol key may also be used for the information.

Next, an embodiment for the document display device in the present embodiment mode is described. Meanwhile, a hardware configuration of the document display device is similar to that in the first embodiment mode, hence omitting its description.

Also in the present embodiment mode, various specific methods, which display markers and key information on a document, may be considered. Therefore, as a most preferable embodiment, the document display program causes markers to be drawn on a transparent sheet of a document, and also causes the markers thus drawn to be retained as it is; and causes the markers with the information attached thereto to be shown up only when an instruction is given by a user. The present embodiment is described based on the above. Further, in describing the present embodiment, the displaying of marker and key information all together is realized by a plug-in, in the same manner as the embodiment in the first embodiment mode.

Figure 11:
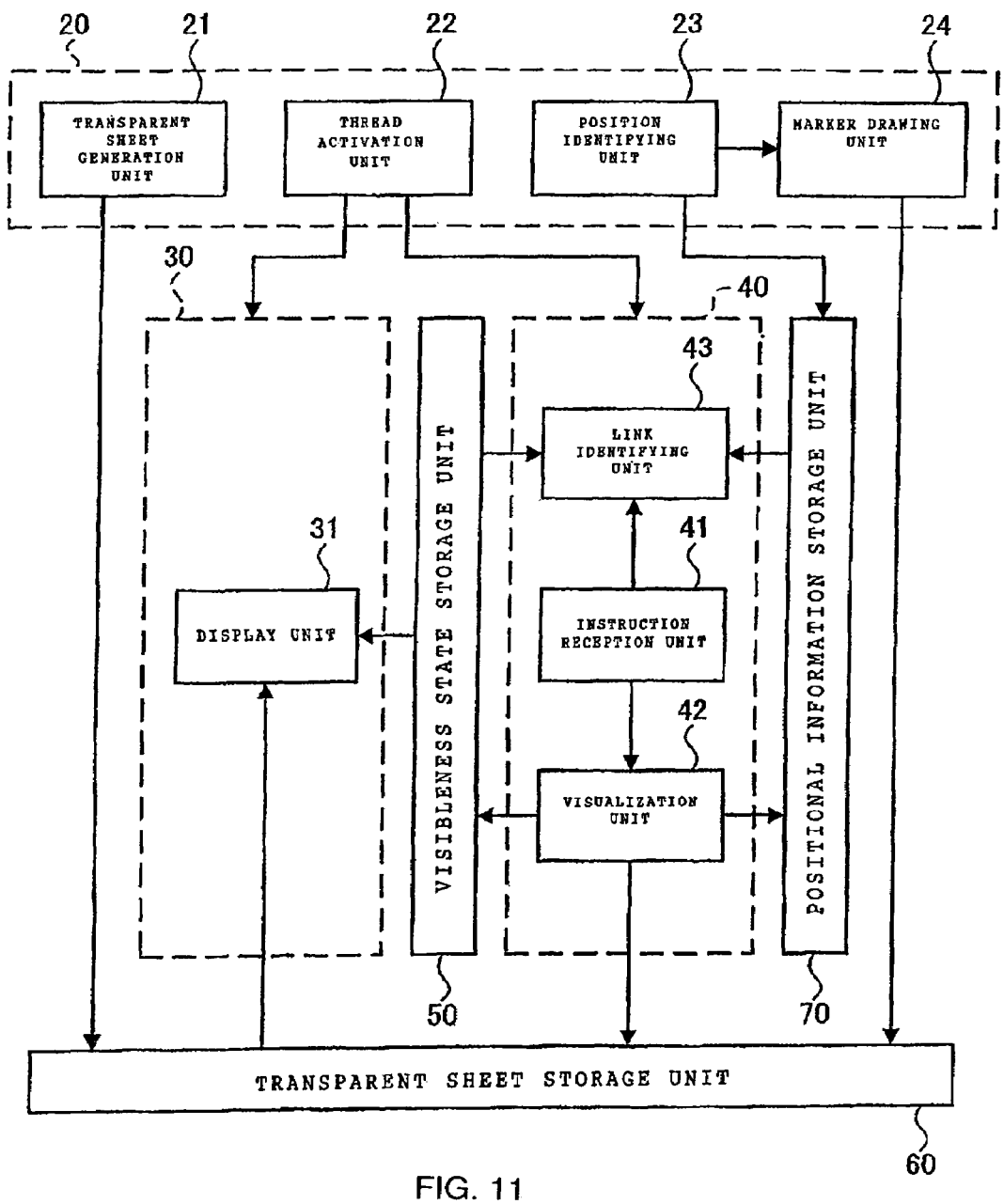
FIG. 11 is a block diagram showing a functional configuration of a document display device in the second embodiment mode according to the present invention.

FIG. 11 is a diagrammatic view showing, among functional configurations for the document display device, a functional configuration, which is realized by mainly executing a plug-in. A document display program where a plug-in is incorporated is read into the main memory 10c by the CPU 10a, and is executed, hence realizing the functions. Here, predetermined functions are realized by operating three threads using the plug-in. To be more specific, the three threads are a control thread 20, a display thread 30 and a visualization thread 40.

Meanwhile, in the main memory 10c, a visibleness state storage unit 50, a transparent sheet storage unit 60, and a positional information storage unit 70 are realized. The visibleness state storage unit 50 is a unit which manages a correspondence between identification information for each sheet, which is managed by the document display program, and a visibleness state corresponding thereto. In the present embodiment, in particular, a correspondence between a transparent sheet and its visibleness state is referred/updated. The transparent sheet storage unit 60 is a unit which stores a transparent sheet that is generated by the control thread 20. In addition, the positional information storage unit 70 is a unit which stores a correspondence between positional information for hyperlinks and key information for the hyperlinks acquired by the control thread 20.

The control thread 20 is operated, whereby a transparent sheet generation unit 21, a thread activation unit 22, a position identifying unit 23, and a marker drawing unit 24 are realized. The transparent sheet generation unit 21 is a unit which has a function of generating a transparent sheet and storing the transparent sheet in the transparent sheet storage unit 60, and which is perceived as a generation means. The thread activation unit 22 is a unit having a function of activating the display thread 30 and the visualization thread 40. The position identifying unit 23 is a unit having a function of acquiring regularly (every $T_1$) information with respect to the places of the embeddings of hyperlinks in a document being displayed, identifying the places thereof, and storing the places thereof in the positional information storage unit 70. The position identifying unit 23 is perceived as an identifying means. The marker drawing unit 24 is a unit having a function of drawing a marker at a position on a transparent sheet, the position corresponding to a display position for a place thus identified. The marker drawing unit 24 is perceived as a drawing means.

Meanwhile, the display thread 30 is operated, and thereby a display unit 31 is realized. The display unit 31 is a unit having a function of reading regularly (every $T_2$) a transparent sheet stored in the transparent sheet storage unit 60, and displaying the transparent sheet in the visibleness state stored in the visibleness state storage unit 50. The display unit 31 is perceived as a displaying means. However, the displaying means may be perceived as a means which includes a function of performing a document display in the document display program.

In addition, the visualization thread 40 is operated, and thereby an instruction reception unit 41, a visualization unit 42, and a link identifying unit 43 are realized. The instruction reception unit 41 is a unit having a function of receiving an instruction from a user, while the visualization unit 42 is a unit having a function of storing the visibleness state for a transparent sheet into the visibleness state storage unit 50; storing keys, which are allocated to respective hyperlinks, into the positional information storage unit 70 in a way that the keys are associated with positional information for the respective hyperlinks; and writing key information for the respective hyperlinks on the transparent sheet, in response to an instruction from a user. The link identifying unit 43 is a unit having a function of identifying hyperlinks in response to an instruction from a user.

Next, the operations of each thread in the present embodiment mode are described.

Figure 6:
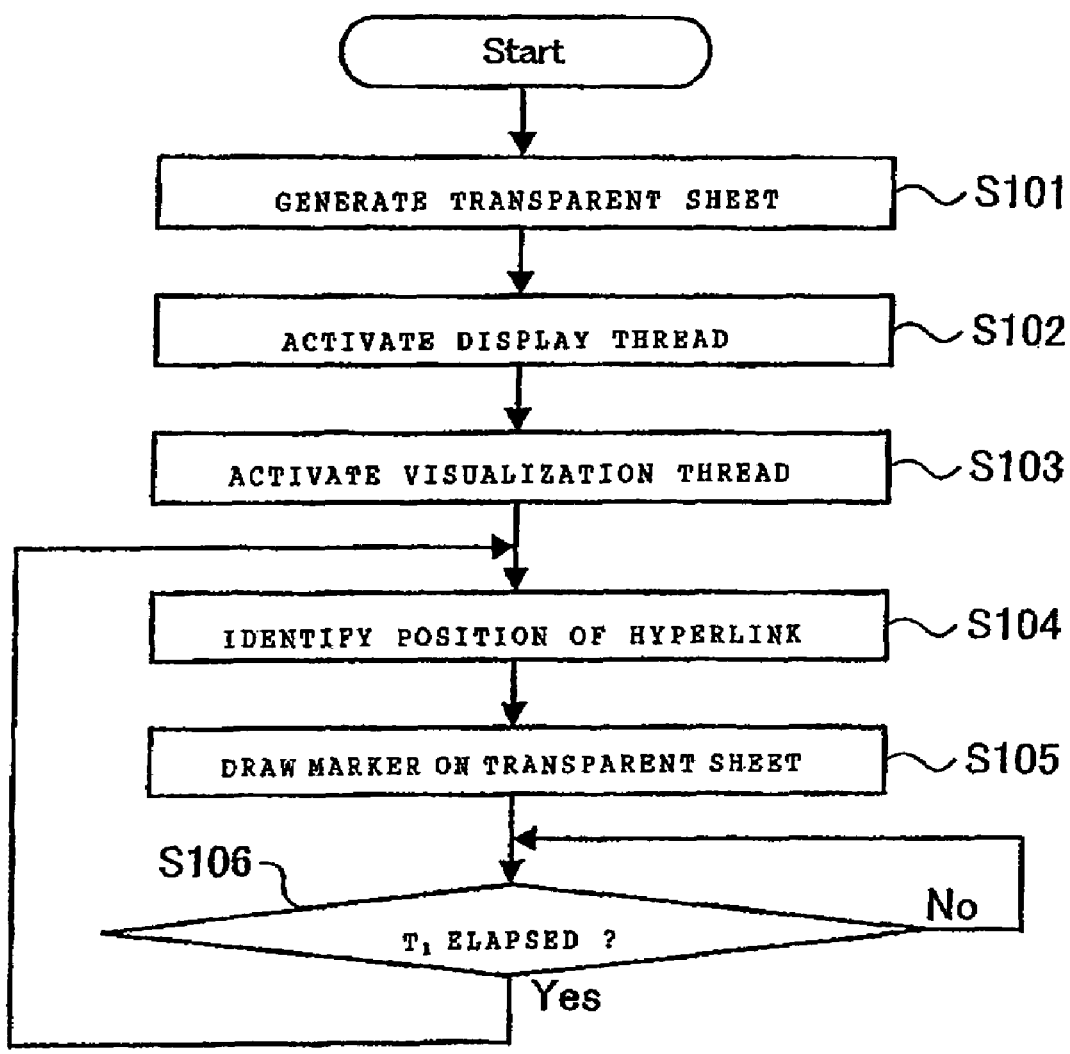
FIG. 6 is a flowchart showing the operations of a control thread in the first embodiment mode according to the present invention.

First, the operations of the control thread 20 are similar to those shown in FIG. 6, hence omitting the detailed descriptions. In the present embodiment mode, however, when the position of a hyperlink is identified in Step 104 of FIG. 6, a process where information with respect to the position is stored in the positional information storage unit 70 is also performed.

Figure 12:
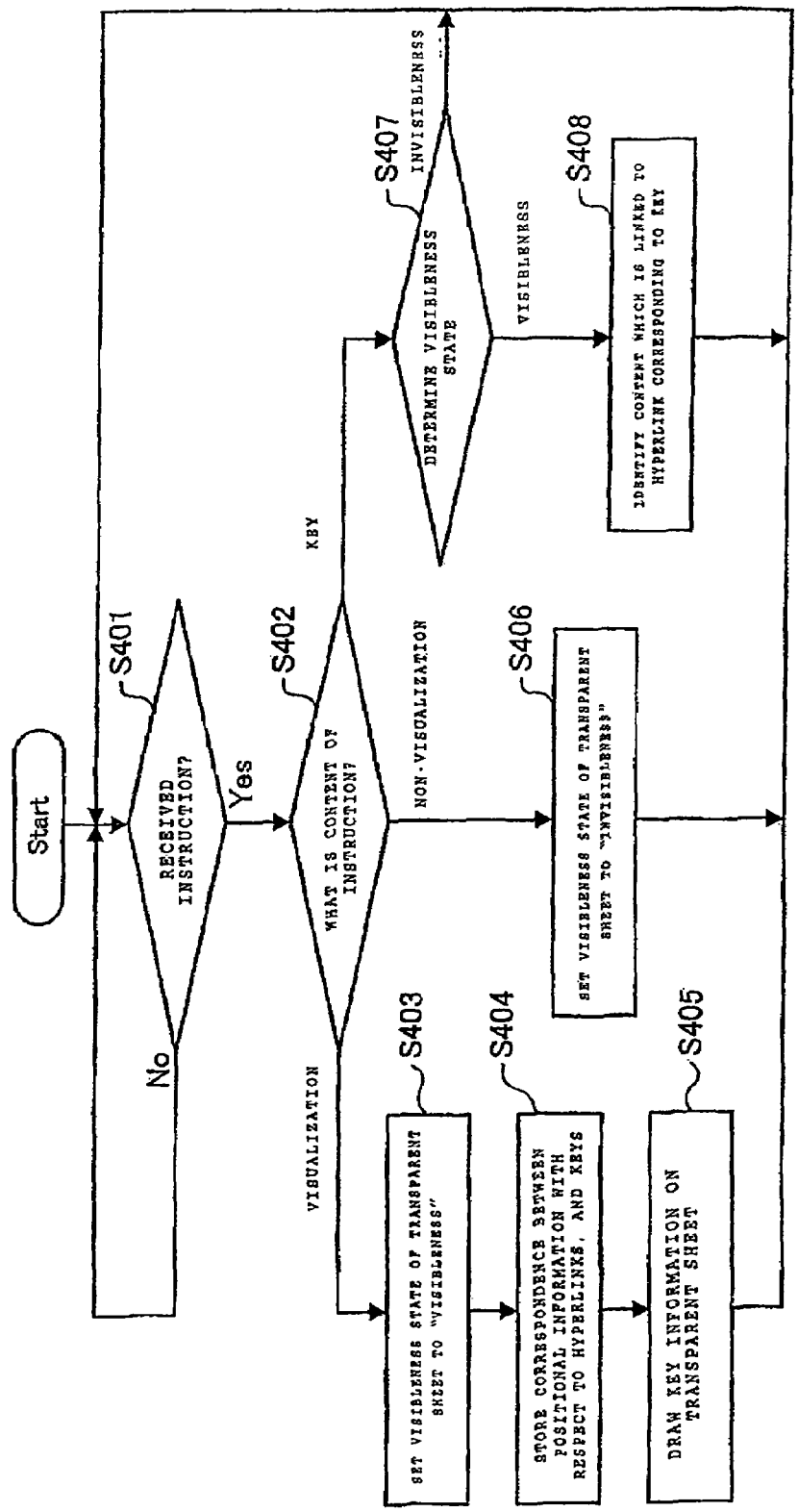
FIG. 12 is a flowchart showing the operations of a visualization thread in the second embodiment mode according to the present invention.

Next, the operations of the visualization thread 40 are described with reference to FIG. 12.

When the visualization thread 40 is activated by the control thread 20, the instruction reception unit 41 first waits an instruction from a user (Step 401). When receiving an instruction, the content of the instruction is determined (Step 402). When the result shows that the content of the instruction indicates "visualization," the visualization unit 42 changes the visibleness state for a transparent sheet in the visibleness state storage unit 50 to be "visibleness" (Step 403). In addition, the positional information for the respective hyperlinks stored in the positional information storage unit 70 is stored in a way that the positional information is associated with arbitrary keys on a keyboard (Step 404), and, at the same time, the key information is written in the vicinities of the markers for the respective hyperlinks on the transparent sheet (Step 405). In contrast, when the content of the instruction indicates "non-visualization," the visualization unit 42 changes the visibleness state for the transparent sheet in the visibleness state storage unit 50 to be "invisibleness" (Step 406).

Meanwhile, in the present embodiment mode, a configuration considered is that, when a key allocated to a hyperlink is pressed down, a document or the like which is linked to the hyperlink is displayed. That is, there is a case where the content of an instruction determined in Step 402 is a display instruction for displaying a document or the like which is linked due to a pressing. In that case, the instruction reception unit 41 determines whether or not a transparent sheet is in a visible state with reference to the visibleness state storage unit 50 (Step 407). When the result indicates visibleness, a hyperlink corresponding to a key which is pressed down is identified, and the identified hyperlink is sent to the document display program (Step 408). Thus, the document display program causes the document or the like linked to the hyperlink to be displayed. However, when the result indicates invisibleness, the process returns to Step 401.

Figure 13:
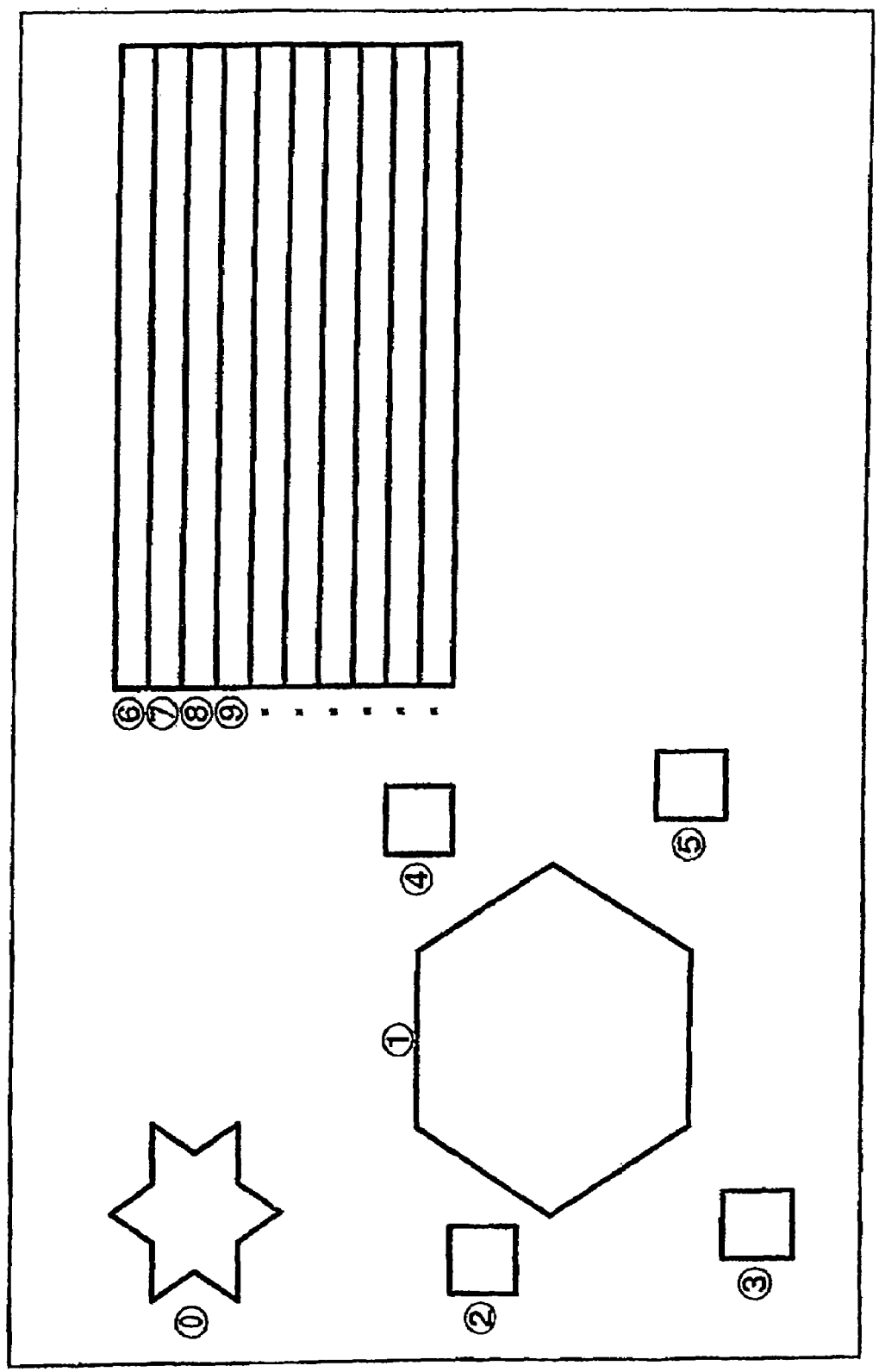
FIG. 13 is a diagrammatic view showing an example of a transparent sheet after drawing markers and key information thereon in the second embodiment according to the present invention.

That is, since a determined result in Step 202 of FIG. 7 indicates "invisibleness" until a user gives an instruction for visualization, the display thread 30 causes a transparent sheet to be non-visualized, and to be displayed. In this case, the screen display is retained as it is, as shown in FIG. 1. Then, when a user gives an instruction for visualization, a determined result in Step 202 of FIG. 7 becomes "visibleness" and thus the display thread 30 causes the transparent sheet to be visualized, and to be displayed. In this case, the transparent sheet where the control thread 20 causes a marker to be drawn and the visualization thread 40 causes the key information to be drawn is displayed on the document. To be more specific, a transparent sheet where graphics are drawn as shown in FIG. 13 is covered on the document in FIG. 1, and is caused to be visualized, hence producing a display such as one shown in FIG. 10.

As described above, in the present embodiment mode, a maker is drawn at a position on a transparent sheet, which is in an invisible state, the position corresponding to a position in a document where a hyperlink is located, and the transparent sheet is visualized in response to an instruction from a user. In addition, a key on a keyboard is allocated to a hyperlink, and by pressing down the key a document or the like which is linked to the hyperlink is displayed. In this configuration, when an instruction for visualization is performed with a keyboard, the displaying of the document or the like which is linked to the hyperlink can also be performed with the keyboard. Hence, since it is not necessary to change devices when performing the instructions, operability is greatly enhanced.

Incidentally, in the present embodiment mode, while, a transparent sheet is used for the drawing of a marker, the sheet is not necessarily a transparent one. That is, a display area, which a document is seen through, is prepared, and a marker may be drawn on the display area.

Although the preferred embodiments of the present invention have been described in detail, it should be understood that various changes, substitutions and alternations can be made therein without departing from spirit and scope of the inventions as defined by the appended claims

What is claimed is:

1. A document display method which is executed by a computer, comprising the steps of:

operating a control thread, a display thread, and a visualization thread;

causing the computer to display a document, which includes a hyperlink embedded in a text part, a still image part, and a moving image part of the document, on a predetermined display area;

moving a graphic along an arrow from a position where the graphic is surrounded with a dashed line in the moving image part of the document, and to a position where the graphic is surrounded with a solid line when a picture image is displayed;

operating the control thread with a transparent sheet generation unit, a thread activation unit, a position identifying unit, and a marker drawing unit;

activating the display thread and the visualization thread with the thread activation unit;

causing the computer to generate a transparent display area, which is established as a higher layer compared to the display area at a position that is overlapped with the display area, and where the document is permeable;

causing the computer to acquire information of places where the hyperlinks are embedded and to regularly identify positions on the display area where the places are displayed with the position identifying unit, and changing the shape of a cursor when the cursor moves to places where the hyperlinks are embedded;

causing the computer to draw specific markers at positions on the transparent display area corresponding to the positions on the display area every time the positions on the display area are identified by the identifying means with the marker drawing unit; and causing the computer to display the specific markers at the positions on the display area where the places, where moving hyperlinks are embedded at the time of an instruction from a user, are displayed, by changing the transparent display area, which is initially in an invisible state, to a visible state in response to said instruction.

2. The document display method according to claim 1, further comprising the steps of:

causing the computer to allocate keys on a keyboard to responsive hyperlinks which are included in the document, and to store the correspondence;

causing the computer to display information indicative of the keys which are allocated to the hyperlinks at the position, at the position on the display area thus identified;

causing the computer to detect depressing of a specific key on the keyboard;

causing the computer to display a document, which is linked to a hyperlink that corresponds to the specific key, in response to detecting the depressing of the specific key;

managing a correspondence between identification information for each transparent sheet with a visibleness state storage unit; and storing a transparent sheet generated by the control thread with a transparent sheet storage unit.

* * * * *